United States Patent Office 3,709,711
Patented Jan. 9, 1973

3,709,711
METHOD OF CAULKING OR STOPPING UP CREVICES OR FILLING UP JOINTS AND THE LIKE IN BUILDINGS
Tage Raymond Holmstrom, Bragevagen 3, Sodertalje, Sweden
No Drawing. Continuation-in-part of abandoned application Ser. No. 702,808, Feb. 5, 1968. This application Feb. 18, 1971, Ser. No. 116,652
Claims priority, application Sweden, Feb. 7, 1967, 1,714/67
Int. Cl. B32b 3/02
U.S. Cl. 117—2 R
5 Claims

ABSTRACT OF THE DISCLOSURE

This invention refers to a method of caulking or stopping up crevices or filling up joints and the like in buildings, such as between window frames and walls. A fine grained, porous material having a closed cellular structure and a low liquid absorbing ability, such as cork crumbs or the like, is mixed with a bonding agent and the mass is injected into the crevices or joints so as substantially to fill up same, and is allowed to solidify into a deformable, coherent mass adhering to the building material which bounds the crevices.

---

The present application is a continuation-in-part of copending application Ser. No. 702,808, filed Feb. 5, 1968, now abandoned.

This invention relates to a method of caulking or stopping up crevices or filling up joints and the like in buildings subjected to considerable action of temperature and/or moisture variations, such as between window frames and walls, between adjacent facade elements and around wall panels, and as sound insulation in connection with internal walls.

Previously known methods for caulking or stopping up crevices or filling up joints in buildings and in which a caulking material, such as hemp, jute, oakum and the like or "Thiokol" rubber is used are not very suitable because the material used is expensive and/or the work is complicated and very time-consuming. Although the sealing effect is usually acceptable, no satisfactory heat insulation is normally obtained.

The object of this invention is to provide a method which at low cost and with a minimum of work can be used for caulking or stopping up crevices or filling up joints and results in the formation of a heat insulating filling which deforms in response to movements occurring in the building material upon temperature and/or mositure variations.

In its broadest aspect the method according to the invention is characterized by injecting a fine grained, porous material having a closed cellular structure and a low liquid absorbing ability, such as cork crumbs, polystyrene foam pellets or the like, mixed with a bonding agent into the crevices or joints so as substantially to fill up the same, and allowing the mixture to solidify into a deformable, coherent mass adhering to the building material which bounds the crevices.

When injecting the porous material, e.g. the cork crumbs or foam pellets, use is made of its compressibility properties so as to ensure satisfactory filling of the joints. Due to the pressure exerted during injection, the material mixture is being compressed. However, at extrusion from the sprayer orifice and entering into the space to be filled, a momentary pressure relief is experienced in the mixture, whereupon it expands, thus attaining an efficient filling of said space.

By way of example, 10 to 35, suitably 12 to 22 parts of weight of cork crumbs, polystyrene foam pellets or the like having a particle size 2 to 5 mm. are mixed with 90 to 65, suitably 88 to 78 parts of weight of a liquid bonding agent consisting essentially of an elastomer and/or a regenerated bonding agent based on a solvent and admixed with resin for improving the adherence of the mixture. By means of a manually, motor driven or pneumatically driven sprayer the mixture is injected into suitable places of a building, such as into crevices between window frames and walls, into joints between facade elements, around wall panels, etc.

The mixture is compressed under a pressure of 3 to 6 kg./cm.$^2$, under which pressure it is compressed to about 45 to 30% of its original volume. When injected from an injection orifice at that pressure into a crevice, it expands over a period of two to three minutes to about 65 to 48% of its original volume, completely filling that crevice and bonding securely to the side walls of the crevice.

If about 17 parts by weight of cork crumbs are admixed with about 83 parts by weight of bonding agent, the most favorable results are reached in practical operation.

After the mixture has solidified it is a deformable, coherent mass which completely fills up the crevices or joints and also cavities which are not visible from the outside.

The deformability of the solidified mixture can be said to be both plastic and elastic which means that the mixture while it is bonded to the building material adapts itself to expansion and contraction movements caused by temperature and moisture variations such that the crevices or the like always will be completely filled up. In addition, the solidified mixture is moisture repelling. The final result is a high degree of both sealing effect and heat insulation.

Instead of cork crumbs the mixture may comprise other fine grained porous materials having a closed texture and a low liquid absorbing ability, such as the polystyrene foam pellets available under the trademark "Frigolite."

The grain size of the porous material should, at most, be 5 mm., preferably not exceeding 2 to 3 mm. Prior to injection, a preservative, as e.g. a fungicide, and/or an antioxidant may suitably be added to the mixture.

As an example, 17% by weight of fine grained cork crumbs having a particle size of 2 to 3 mm. were admixed with 83% by weight of a binder having the following composition:

Natural rubber 96.3% by weight;
Polyterpene resin as a tackifier, of the type sold under the trademark "Picolite" 3.3% by weight;
Phenol condensate as an antioxidant, of the type sold under the trademark "Nonox" 0.3% by weight; and
Para-chloro-meta-cresol as a preservative, of the type sold under the trademark "Preventol" 0.06% by weight.

This mixture was compressed under a pressure of 4.5 kg./cm.$^2$ to about 37% of its original volume and was injected at that pressure from an orifice into a crevice. During the period of 2.5 minutes, the mixture expanded to about 56% of its original volume and had a close bond with the side walls of the crevice and completely filled the crevice.

When pellets of expanded polystyrene foam are used, the weight ratio between the fine grained porous material and the bonding agent should be about 10:90, in view of the fact that plastic foam is less dense than cork.

In discussing the compressible fine grained porous material having a closed cellular structure, and the binder, it should be emphasized that the particular nature of the porous material and the particular nature of the binder are not critical. Any porous material having the properties described above, and any binder having the properties described above, will serve; and numerous examples of such porous material and binder will suggest themselves to persons having ordinary skill in this art. Instead, the crucial steps of the present invention are the injection of the mixture of this material and binder under pressure into the crevices so as substantially to fill the crevices and then allowing the mixture to expand in the crevices and to solidify into a deformable, coherent mass adhering to the side walls of the crevices.

Having described my invention, I claim:

1. A method of caulking crevices in buildings, comprising forming a mixture consisting essentially of 10–35% by weight of a readily compressible fine grained porous material having a closed cellular structure and a low liquid absorbing ability and selected from the group consisting of cork crumbs and plastic foam pellets, balance essentially liquid elastomeric binder, compressing said mixture to about 30 to 45% of its original volume under a pressure of 3 to 6 kg./cm.$^2$, injecting said compressed mixture under pressure into the crevices so as substantially to fill the same, and allowing the mixture to expand in the crevices and to solidify into a deformable, coherent mass adhering to the building material which bounds the crevices.

2. A method as claimed in claim 1, in which said mixture consists essentially of 12 to 22% by weight of said material and 88 to 78% by weight of said binder.

3. A method as claimed in claim 1, in which said mixture consists essentially of about 17 parts by weight of said material and about 83 parts by weight of said binder.

4. A method as claimed in claim 1, in which said material has a grain size of 2 to 5 mm.

5. A method as claimed in claim 1, in which the injection of said mixture is effected from an orifice, the pressure relief of said mixture upon leaving said orifice permitting the mixture to expand to fill the crevice.

References Cited

UNITED STATES PATENTS

| | | | |
|---|---|---|---|
| 3,298,970 | 1/1967 | Stare et al. | 117—2 R X |
| 1,953,452 | 4/1934 | Wertz | 264—36 X |
| 3,200,030 | 8/1965 | Oita | 117—2 R X |
| 2,888,359 | 5/1959 | Jorgensen et al. | 264—36 X |
| 2,069,674 | 2/1937 | Maury | 117—2 R X |
| 3,566,968 | 3/1971 | Marx | 106—33 X |
| 3,580,870 | 5/1971 | Rosner | 106—33 X |

RALPH S. KENDALL, Primary Examiner

C. WESTON, Assistant Examiner

U.S. Cl. X.R.

106—33; 264—36